United States Patent [19]

Sabin

[11] Patent Number: 5,172,622
[45] Date of Patent: Dec. 22, 1992

[54] QUICK CHANGE DIE CUTTER

[75] Inventor: Robert E. Sabin, Kansas City, Mo.

[73] Assignee: Lamcraft, Inc., Raytown, Mo.

[21] Appl. No.: 791,019

[22] Filed: Nov. 12, 1991

[51] Int. Cl.[5] ............................ B26F 1/14; B26D 7/00
[52] U.S. Cl. ........................................ 83/520; 83/146;
83/633; 83/658; 83/662; 83/698
[58] Field of Search .................. 83/452, 658, 684, 691,
83/698, 146, 627, 632, 633, 662, 520, 145;
101/316, 373, 383, 384, 30

[56] References Cited

U.S. PATENT DOCUMENTS

| 2,728,394 | 12/1955 | Schulz | 83/146 |
|---|---|---|---|
| 2,842,037 | 7/1958 | Gobeille et al. | 101/474 X |
| 3,332,308 | 7/1967 | Keen | 83/698 X |
| 3,509,789 | 5/1970 | Dye | 83/145 |
| 3,747,458 | 7/1973 | Brown | 83/520 |
| 3,782,166 | 1/1974 | Whistler, Jr. et al. | 83/698 X |
| 3,868,904 | 3/1975 | Wulf | 101/316 |
| 3,958,508 | 5/1976 | Sakurai | 101/474 |
| 3,982,458 | 9/1976 | Terasaka | 83/698 X |
| 4,143,569 | 3/1979 | Marconi | 83/146 X |
| 4,552,050 | 11/1985 | Grefe | 83/698 X |
| 4,586,414 | 5/1986 | Block | 83/684 X |
| 4,587,830 | 5/1986 | Mills | 83/698 X |

FOREIGN PATENT DOCUMENTS 595585  4/1960  Canada ............................ 83/698

OTHER PUBLICATIONS

Four (4) photographs of a die cutter made prior to applicant's invention by Fred Marvel.

Primary Examiner—Frank T. Yost
Assistant Examiner—Clark F. Dexter
Attorney, Agent, or Firm—Hovey, Williams, Timmons & Collins

[57] ABSTRACT

A quick change die cutter is provided for permitting interchangeable die elements to be readily inserted and removed without the need for tools. A receiver is provided for carrying the die element which presents a cutting edge thereon, and a lever serves to shift the die element into engagement with the web of sheet material to be cut thereby. A pad of relatively soft material such as synthetic resin is positioned to engage the cutting edge as it passes through and cuts the web, thereby eliminating set-up time necessary to prevent the cutting edge of the die from damage due to excessive vertical travel. The receiver preferably includes a pair of opposed side walls for receiving the die element in the space therebetween, at least one of the side walls including a locking member for inhibiting shifting of the die along the respective side walls and out of alignment with the web to be cut.

6 Claims, 3 Drawing Sheets

QUICK CHANGE DIE CUTTER

BACKGROUND OF THE INVENTION

1. Field of the Invention

The present invention is broadly concerned with a die cutter providing ready interchangability of die elements whereby the die elements may be properly aligned and retained in position, and which minimizes the wear to the cutting edge of the die for die cutting by hand. More particularly, it is concerned with a die cutter which is small, can be readily used by hand for limited runs, and includes a receiver which quickly locates the die element carried thereby and locks it in position, preferably over a pad of relatively soft material so that the life of the cutting edge is maximized during cutting of a web of sheet material.

2. Description of the Prior Art

Die cutting is a process whereby a series of shapes may be uniformly cut from a web of sheet material by a die presenting a cutting edge thereon. Die cutters are well known in the printing industry where large numbers of shapes are cut from, for example, a continuous roll of paper. However, such die cutting machines are designed for mass production cutting a large number of shapes, and are thus large, expensive, and require the use of associated machinery for feeding and take-up of the web.

In many smaller operations, sheets of paper, photographs, gaskets and other webs of sheet material may need to be cut to a uniform shape on a low volume or individual run basis. Many retail establishments would like to have the ability to have a small, relatively inexpensive die cutter provided with a variety of interchangeable dies, but such die cutters are largely unknown. An especially important consideration is the ease with which the dies may be changed because such operations may demand that only one or two die cut labels, gaskets, or other products may be required at a time.

In addition, the individual dies often include a cutting edge of steel in a shape as specified by the user. Such dies may be custom made and sold at a price determined by the number of lineal inches of the cutting edge. When the dies become worn, they are difficult to sharpen to maintain a precise and even cutting surface, and thus replacement may be required when the surface below the web to be cut dulls the edge. At least as serious is the uneven wearing of the edge, whereby the cutting edge strikes the web unevenly, producing only partial cuts of the web corresponding to only a portion of the cutting edge. The end result is premature replacement of the die, which can prove quite expensive.

Finally, the web itself is often free to move about beneath the die element. A stable anvil or platform beneath the web is thus desirable. When the surrounding portion of the material cut by the cutting edge is the portion to be used, the net result may well be that the assembled product, for example a custom greeting card, is out of registry because the web was not consistently positioned through successive cutting operations.

SUMMARY OF THE INVENTION

These problems have largely been solved by the quick change die cutter of the present invention. That is to say, the quick change die cutter hereof provides for easy interchangability of die elements, minimizes wear on the expensive cutting edge of the die, and permits the web to be cut to be accurately and, in the case of repetitive processes, consistently located beneath the cutting element.

The quick change die cutter in accordance with the present invention broadly includes a frame supporting a receiver. The receiver is configured to receive a die element which can be removed and installed without the need for tools. A shifting mechanism serves to move the cutting edge of the die element into engagement with the web to be cut. Preferably, the receiver includes a pair of opposed, spaced-apart side walls, at least one of the walls mounting a locking mechanism for holding the die element against shifting along the walls. The die cutter hereof also preferably includes a pad of a material softer than the material of the cutting edge of the die element to reduce wear on the latter and to enable the cutting edge to penetrate completely through the web even when unevenly worn.

In greater detail, the receiver is preferably provided with a ledge extending along each side wall and projecting inwardly toward the space therebetween. The ledge serves to support the die element. In addition, each of the side walls may include a stop in the form of an ear affixed to one end of the side wall so that the die element is free to slide along the ledges until engaged by the stop, thereby permitting quick loading of the die element into the receiver. As noted above, quick and easy loading of interchangeable die elements which may be locked into position without the necessity of additional tools is an especially desirable object of the invention. The die element is raised and lowered into and out of cutting engagement with the web by a shifting mechanism which can be, for example, a lever which is pivotally mounted in an over-centering relationship so that appropriate leverage can be applied.

The pad is preferably of a relatively soft, inexpensive, synthetic resin material such as a sheet of polyethylene. Such material provides the necessary rigidity to resist compression by the cutting edge and thus avoid ragged cut edges on the web, while still minimizing wear to the cutting edge of the die. Instead of the excessive set-up time necessary to install shims for preventing damage to the cutting edge of the die element by a hard platen, the pad hereof is able to absorb the cutting edge and cause very little wear thereto even if the cutting edge should penetrate the pad. The pad is preferably loosely located within a gasket fixed to a base of the die cutter to which the frame is attached, and thus the pad is able to "float" so that the edge of the die does not strike the same location on the pad during successive cutting strokes. Advantageously, the pad is flat on both an upper and lower surface thereof and equilateral with each side thereof having the same dimension so that after substantial wear on one surface, the pad can be reversed and/or rotated 90° to thereby prolong the life of the pad.

In order to properly position the web for accurate location of the cut therethrough, a plate is located over the pad. The plate presents an opening therethrough to expose at least a portion of the pad. The plate preferably includes at least one flange along its peripheral edge, the upstanding flange serving to aid in positively locating a template of paper or other easily cut material so that successive webs placed beneath the template may be accurately located for cutting by the die element. This is particularly advantageous when photographs or other webs having a principal image to be located within the shape defined by the cutting edge of the die element are to be cut, and reduces the likelihood that an image will be offset or a portion of the desired image removed during the die cutting process. In addition, to hold the template in place, a spring-biased clip clamps the web against the plate, the plate being preferably configured to resist lateral movement through engagement with a portion of the frame.

DESCRIPTION OF THE PREFERRED EMBODIMENT

Figure 2:
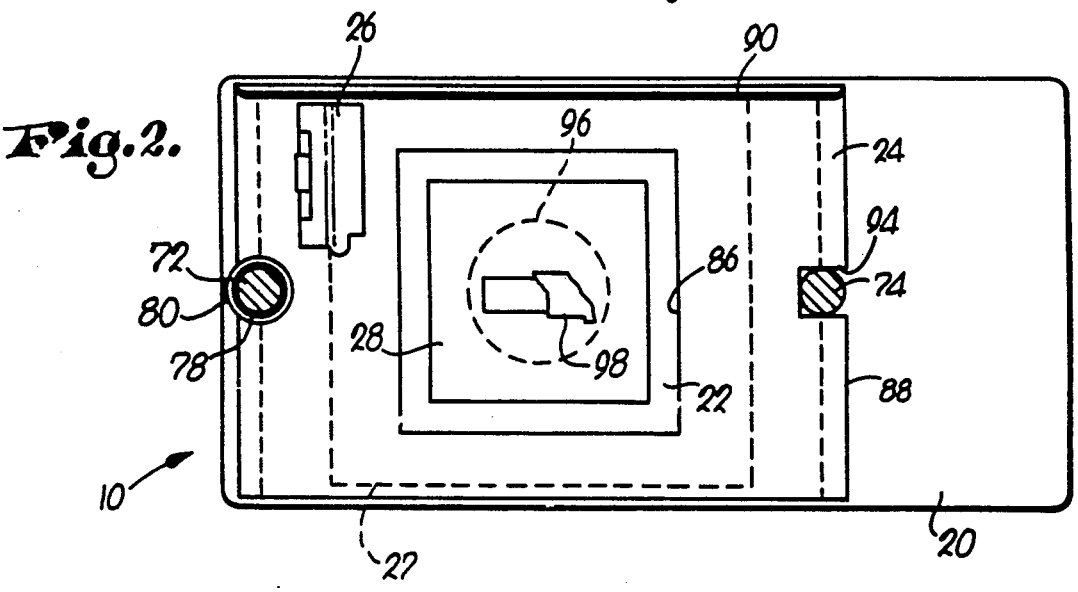
FIG. 2 is a horizontal cross-sectional view along line 2—2 of FIG. 1 showing the plate and pad positioned on the base of the die cutter hereof, with a paper template shown in phantom.
Figure 3:
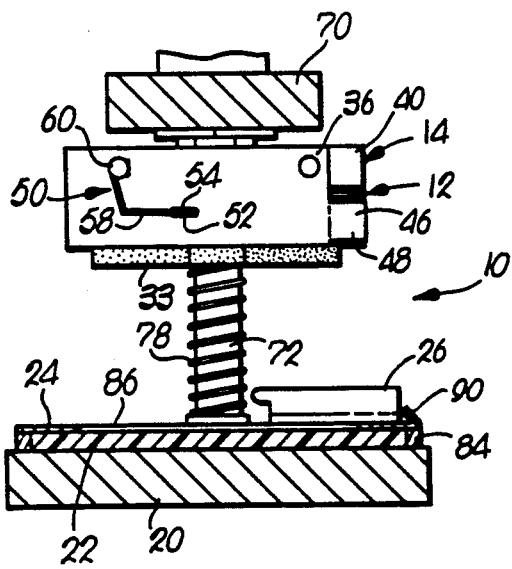
FIG. 3 is a fragmentary vertical cross-sectional view along line 3—3 of FIG. 1, showing the locking mechanism and stop of the receiver.

Referring now to the drawing, a quick change die cutter 10 in accordance with the present invention broadly includes a die element 12, a receiver 14, a shifting mechanism 16, a frame 18, a base 20, and a pad 22. A plate 24 is positioned over the pad 22 and is provided with a spring-biased clip 26 for holding a template 27 under which a web 28 of sheet material such as paper, gasket material or e.g., a photograph as shown in FIG. 2, is placed so that the web 28 may be manually positioned and the precise location of the cutout made in the web 28 may be predicted before the cut is made.

In greater detail, the die element 12 includes a body 30 which is preferably provided with at least two flat, upstanding sides and may be made of, e.g., wood or a clear synthetic resin material such as polycarbonate when it is desirable to be able to see through the die body during the cutting operation. Projecting downwardly from body 30 is cutting edge 32. The cutting edge 32 is preferably of steel or other hard, thin material to provide good penetration through the web 28. The cutting edge 32 may be surrounded by a layer of sponge rubber 33 or a synthetic substitute thereof which serves to protect the cutting edge 32 and the user thereof, as well as aide in releasing the die-cutting scrap and the desired die-cut image from the die element 12 after cutting.

The receiver 14 is provided with a pair of spaced-apart sidewalls 34 and 36 defining a space 38 therebetween which is normally occupied by the body 30 of the die element 12. The receiver 14 also includes a top wall 40 to which the sidewalls 34 and 36 are attached. The sidewalls 34 and 36 each include a ledge 42 and 44 which project inwardly toward space 38 and thus toward the opposite sidewall. The ledges 42 and 44 serve to support the die element 12 thereon and position the latter below the head 40. The ledges 42 and 44 are integrally formed with their respective sidewall 34 and 36. In addition, ears 46 extend rearwardly from each sidewall 34 and 36 to form a stop 48 which inhibits the die element 12 from passing out the rear of the receiver 14. In the embodiment shown in the drawing, the ears are obliquely angled inward relative to each ear's respective sidewall to conform to the body 30 of the die, but it may be appreciated that the ears may be oriented inwardly at right angles to the sidewalls to form an effective stop.

Each sidewall 34 and 36 is provided with a locking mechanism 50. Locking mechanism 50 includes a projection 52 which extends through a port 54 in each sidewall whereby the projection 52 may engage a recess 56 on the body 30 of the die element 12 between the sidewalls 34 and 36. Each locking mechanism 50 serves to grip the recess 56 because the arm 58 thereof is of a spring-wire material held by a rivet 60 or other fastener and thus the projection 52 is biased inwardly.

The shifting mechanism 16 includes a hand actuatable lever 62 which is pivotally mounted both to legs 64 and 66 and to shaft 68. The shaft 68 is in turn connected to head 40 for raising and lowering the die element 12. A shifting mechanism 16 useful in accordance with the invention is model CL-350-TPC from Carr-Lane of St.Louis, Mo.

Figure 1:
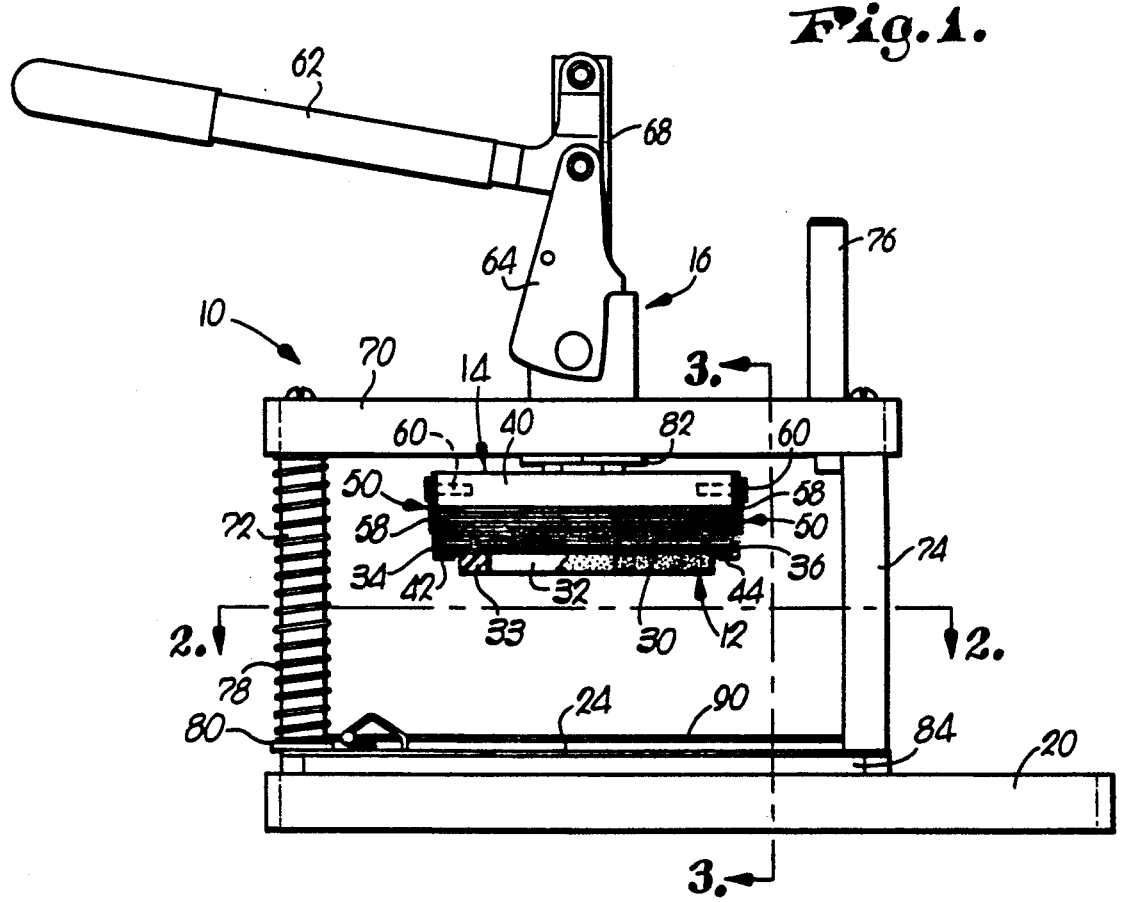
FIG. 1 is a front elevational view of the quick change die cutter in accordance with the present invention.
Figure 4:
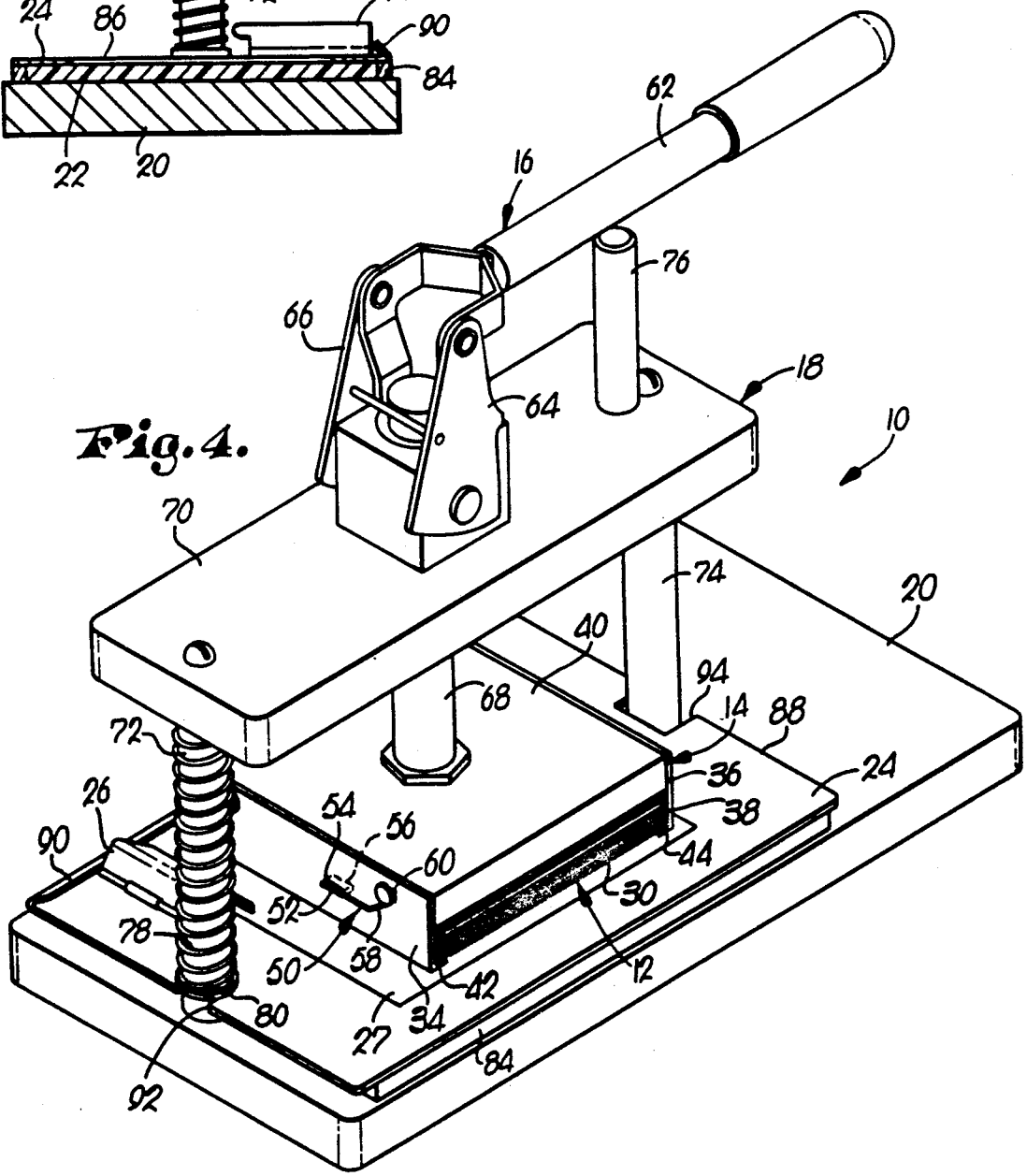
FIG. 4 is a perspective view of the quick change die cutter hereof showing a layer of sponge rubber surrounding the cutting edge of the die element in phantom.
Figure 5:
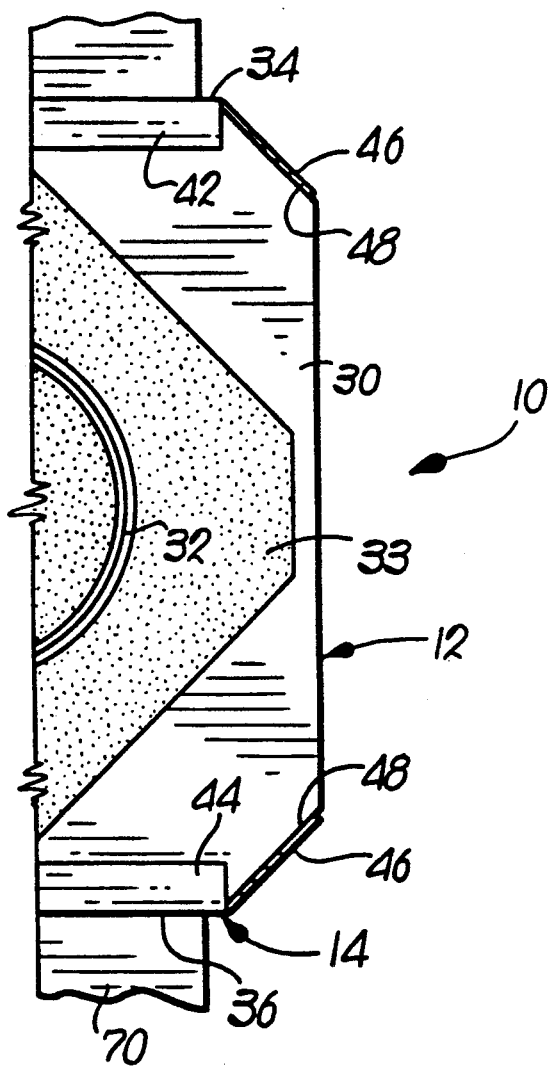
FIG. 5 is a fragmentary bottom plan view of the receiver and the die element showing the ears on the receiver projecting inwardly to form a stop.

The frame 18 broadly includes a deck 70, a pair of upright supports 72 and 74 connecting the deck 70 with base 20, and lever stop 76. A coil spring 78 is wrapped around one of the supports, engages the underside of deck 70 and extends downwardly to a slide 80 for contacting plate 24 and holding it down as shown in FIG. 4. The shifting mechanism 16 is mounted on deck 70 and held in position by a hex nut 82 extending into a relieved area on the underside of the deck 70, as may be seen in FIG. 1.

Base 20 is preferably heavily weighted to provide a stable platform for die cutting and thus is of a solid construction and preferably of steel or the like. The base 20 is provided with a rubber gasket 84 for supporting the plate 24 thereon, and located in surrounding relationship to the pad 22, shown in phantom in FIG. 1. Pad 22 is preferably of a sheet of polyethylene or other synthetic resin material which, though reasonably rigid to prevent the web from pressing therein, is relatively soft in comparison to the cutting edge 32. The pad 22 is preferably flat on both the upper and lower surface thereof so that it can be removed and reversed when the initially upper surface has become deeply scored or otherwise penetrated by the cutting edge.

The plate 24 presents structure defining a central opening 86 to expose at least a portion of the pad 22 therebeneath. The plate mounts a conventional spring clip 26 such as is sold under the name "temp clip" by Charles Leonard of New York as part number "bcl 2". The clip 26 serves to hold the template 27 in position over the pad 22 and web 28. In addition, the plate 24 presents a peripheral edge 88, and along one side thereof a flange 90 extends upwardly to serve to locate the template 27 thereagainst. Notches 92 and 94 in the peripheral edge 88 engage supports 72 and 74 respectively and thus stabilize plate 24 against lateral movement.

In operation, the user need only place the appropriate die element 12 into the receiver 14, locate a sheet of paper or other template 27 over the plate 24 and secure the template 27 in position against the flange 90 and underneath clip 26. The operator then actuates the lever to force the die element 12 down and through the template 27 to cut out the desired shape 96 (shown in phantom in FIG. 2) as defined by the cutting edge 32. Then, the web 28 is placed over the pad 22 and beneath the template 27 so that the web 28 is properly positioned and the operator may predict the position of the cut to be made in the web by viewing the web 28 through the opening in the template 27. In the example shown in FIG. 2, web 28 constitutes a photograph presenting a principal image 98, which may be centered within the shape 96 cut in the template 27. The operator then actuates the lever to push the cutting edge 32 of the die element 12 downward and cut out the desired portion of the web 28 corresponding to the shape 96 in the template 27 located thereabove. The lever stop 76 prevents excessive penetration of the cutting edge 32 into the pad 22. No tools are required to substitute a new die element 12—the user need only pull the die element out along the ledges 42 and 44 between the respective sidewalls 34 and 36 so that the projections 52 release from the recesses 56 as the die element 12 slides along ledges 42 and 44 and out of the receiver 14. A new element is easily installed in the receiver by sliding the body 30 into space 38 until the projections click into the recesses 56 and the body 30 engages ears 46.

Not only is the cutting edge 32 of the die protected by the surrounding layer of sponge rubber, but the pad 22 further protects the cutting edge from wear by its relative softness compared to the cutting edge 32. The cutting edge 32 need not be perfectly even and planar because the pad 22 absorbs the cutting edge 32 and thereby compensates for roughness and imprecision. Once the pad 22 is sufficiently worn on an upper surface, the plate 24 may be lifted and the pad 22 may be turned over so that the former bottom surface is now the top. If a number of different die elements for cutting different shapes are used, they will enjoy ample useful life, and in any event is far less expensive to replace than the die element.

The notches 92 and 94 hold the plate in position. Thus, by using clip 26 to hold a sheet of paper or other material such as template 27 in place, the location and accuracy of the cut made by the die element may be ensured.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the liberal scope of the invention as set out in the following claims.

I claim:

1. A quick change die cutter for cutting a web of sheet material placed therein comprising:
   a frame;
   a die element presenting a cutting edge and having a body including a locating recess therein;
   means for shifting said cutting edge of said die element into and out of engagement with the web;
   a receiver connected to said shifting means for carrying said die element, said receiver including a pair of opposed spaced-apart walls defining a space therebetween for slidably receiving said die element therein, said walls each further including a ledge projecting toward the opposing sidewall for supporting said body of said die element, at least one of said sidewalls including a stop associated therewith for aligning the die element, said receiver further having locking means associated with at least one of said sidewalls for releasably locking said die element without the need for tools against said sliding movement along said at least one sidewall said locking means further comprising a projection and means spring-biasing said projection inwardly toward said space for positioning said projection in said locating recess when said die element slide into properly aligned position in said receiver; and
   means for holding a template in position for arrangement with the cutting edge of said die element.

2. A quick change die cutter as set forth in claim 1 wherein said receiver includes a top wall connected to said shifting means.

3. A quick change die cutter as set forth in claim 1 wherein the stop includes an ear associated with each of said sidewalls for aligning the die element positioned between the sidewalls.

4. A quick change die cutter as set forth in claim 1 including a synthetic resin pad positioned beneath the die element for receiving thereon the cutting edge when the die element is shifted vertically downwardly into cutting relationship with the web.

5. A quick change die cutter as set forth in claim 4 including a plate positioned over said pad and defining an opening therethrough, said plate mounting said template-holding means.

6. A quick-change die cutter as set forth in claim 5 wherein said plate further includes a peripheral edge presenting an upstanding flange along at least a portion of the edge of use in aligning the template.

* * * * *